United States Patent

Braun et al.

[15] 3,701,859

[45] Oct. 31, 1972

[54] UNIPARTITE READ/WRITE AND/OR CENTER SECTION HOUSING FOR DUAL GAP MAGNETIC HEAD ASSEMBLIES EMPLOYING UNITARY INTERTRACK SHIELDING EXTENSIONS

[72] Inventors: Richard E. Braun, St. James; Lionel G. Hopkins, Lake Grove, both of N.Y.

[73] Assignee: Magnetic Head Corporation, Hauppauge, N.Y.

[22] Filed: May 12, 1971

[21] Appl. No.: 142,673

[52] U.S. Cl. ..........................................179/100.2 C

[51] Int. Cl. ..............................................G11b 5/26

[58] Field of Search..........179/100.2 C; 340/174.1 F; 346/74 MC

[56] References Cited

UNITED STATES PATENTS

| | | | |
|---|---|---|---|
| 2,927,974 | 3/1960 | Stovall | 179/100.2 C |
| 3,150,357 | 9/1964 | Bargetzi | 179/100.2 C |
| 3,414,971 | 12/1968 | Boehme | 340/174.1 F |
| 2,928,907 | 3/1960 | Lubkin | 179/100.2 C |

*Primary Examiner*—Stanley M. Urynowicz, Jr.
*Assistant Examiner*—Robert S. Tupper
*Attorney*—Colton & Stone, Inc.

[57] ABSTRACT

The opposed read and write head section housings of a multiple track, dual gap magnetic head assembly as well as the center section separating the same are fabricated from a non-magnetic material having high electrical conductivity. Each of the housing and center sections include unitary portions thereof providing the total interhead and intertrack shielding.

9 Claims, 7 Drawing Figures

INVENTORS.
RICHARD E. BRAUN
LIONEL G. HOPKINS

BY Colton + Stone

ATTORNEYS.

PATENTED OCT 31 1972

3,701,859

INVENTORS.
RICHARD E. BRAUN
LIONEL G. HOPKINS

BY Calton & Stone

ATTORNEYS.

INVENTORS.
RICHARD E. BRAUN
LIONEL G. HOPKINS

BY Colton & Stone
ATTORNEYS.

UNIPARTITE READ/WRITE AND/OR CENTER SECTION HOUSING FOR DUAL GAP MAGNETIC HEAD ASSEMBLIES EMPLOYING UNITARY INTERTRACK SHIELDING EXTENSIONS

BACKGROUND OF THE INVENTION

The conventional dual gap magnetic head assembly includes opposed read/write housing sections separated by a center section and each of which sections is comprised essentially of non-magnetic material, usually brass or aluminum, having a relatively low electrical conductivity when compared to certain other conductors such as copper for example. The opposed housing sections normally contain the active or wound core sections while the center section conventionally houses the return or inactive core sections. Typically, the active core section may comprise a "C" core while the return may comprise an "I" core although both sections may be active or of any desired configuration.

It is essential that some type shielding be provided to preclude that signal interference coupling between the write and read heads variously referred to as "-feedthrough," "cross-coupling" and "cross-talk." Progressive advancements in the art of interhead shielding have included external shielding as in U.S. Pat. No. 2,981,805; internal center section shielding relying upon one or more electromagnetic shields, such as "Hy Mu 80," sandwiched within non-magnetic center housing sections as in U.S. Pat. No. 3,064,333; and an analogous approach using a solid copper center section between spaced, single track pick-up heads as in U.S. Pat. No. 2,885,488.

Similarly, in the case of multiple track heads, intertrack shielding is required which typically takes the form of laminated shield structures employing at least one electromagnetic shielding lamina, such as "Hy Mu 80." Exemplary are the disclosures in U.S. Pat. Nos. 3,064,333 and 3,249,928.

Magnetic head assemblies require very precise alignment of their component parts for reasons well understood by those skilled in the art. The use of laminated shield structures represent a major limiting factor in achieving closer manufacturing tolerances because of the error magnification which is an inherent function of a multiple assemblage from separate parts.

Perhaps an even greater objection to the use of those laminated shielding structures which have heretofore been regarded as unavoidable in the manufacture of multiple track, dual gap head assemblies is the manufacturing cost. These assemblies are inherently expensive due to the relatively sophisticated equipment required for precision machining and calibration which equipment does not, however, involve excessive labor costs. The fabrication of multiple, precision shielding laminates requires, in addition to precise jigs and/or fixtures, a substantial labor factor as will be apparent. A lesser but significant cost factor is represented by the additional machining operations which are routinely performed on the housing and/or center sections to provide those recesses which receive the separately fabricated shielding structures. In this latter connection, a failure to provide such machined recesses to receive the shielding laminates, such as by simple interdigitating the shields and cores, results in an even greater error magnification as will be apparent.

SUMMARY OF THE INVENTION

The three major components, from the standpoint of bulk, in a multiple track, dual gap magnetic head assembly are the read and write housing sections and the intermediate or so-called center section. Each of these sections is fabricated from a highly conductive, non-magnetic material such as copper and interrelated with the various transducer sections in such manner as to provide the total interhead and intertrack shielding required solely as a function of the physical positionment of the parts. More specifically, as regards intertrack shielding, each of the aforesaid housing and center sections is machined in such a manner that each transducer section in each housing section is separated from every other transducer section in the same housing section by an integral intertrack shielding extension of the housing section itself. Furthermore, the center section housing provides the necessary interhead shielding.

Inasmuch as the well known phenomenon of eddy current development in a highly conductive member so positioned between adjacent magnetic circuits has been found to effectively dissipate that flux which would otherwise link adjacent transducer sections; it is unnecessary to provide additional shielding involving the usual magnetic laminate. This eliminates the error magnification associated with the laminated assemblages as well as the high labor costs incidental thereto. Furthermore, those machining operations incident to the precise positionment of the laminated shielding are no longer required.

It is not fully understood just why the inherent eddy current establishment in a conventional brass or aluminum housing section is insufficient to dissipate cross-talk; however, extensive experimentation indicates that the increase in eddy current development with increasing conductivity of the particular shielding material reaches an effective flux blocking threshold for those flux densities common to present day magnetic head assemblies at a conductivity level intermediate that of brass (7.0 micro-ohm centimeters at 20°C.) and aluminum (2.824 micro-ohm centimeters at 20°C.) on the one hand and copper (1.7+ micro-ohm centimeters at 20°C.) on the other. It appears that the electrical conductivity required is that of a material whose resistivity is less than about 2 micro-ohm centimeters at 20°C.

Insofar as the center section housing, per se, is concerned previous center sections within which portions of the various transducer sections are received have required a minimum of three separate parts; two outer non-magnetic, center section panels which are recessed to receive transducer sections, usually the inactive or "I" cores, and a central magnetic shield. The center section subassemblies are than integrated, usually by a bonding material, to provide a modular center section for subsequent assembly with the read/write housing sections. In accordance with the practice of the invention, it is only necessary to machine transducer receiving recesses in opposite sides of a copper blank to produce an equivalent center section which not only provides the interhead shielding previously afforded by the intermediate magnetic shield but, also, provides intertrack shielding between the transducer sections.

Similarly, the integral, unitary extensions of each read and write housing section which are formed as an incident of the formation of the transducer section receiving recesses provide intertrack shielding thus dispensing with the necessity for machining additional laminate shield receiving recesses.

Due to the greater structural integrity of a solid center section as contrasted with an assemblage of parts, it is far easier to achieve the critical parallelism tolerances of a few millionths of an inch required of the opposed center section sides.

An even more important advantage in the utilization of a totally non-magnetic center section insofar as signal fidelity is concerned is the elimination of those residual erase properties inherently associated with any magnetic material positioned adjacent a recordable magnetic medium.

DESCRIPTION OF THE PREFERRED EMBODIMENT

Figures 1, 2, 3:
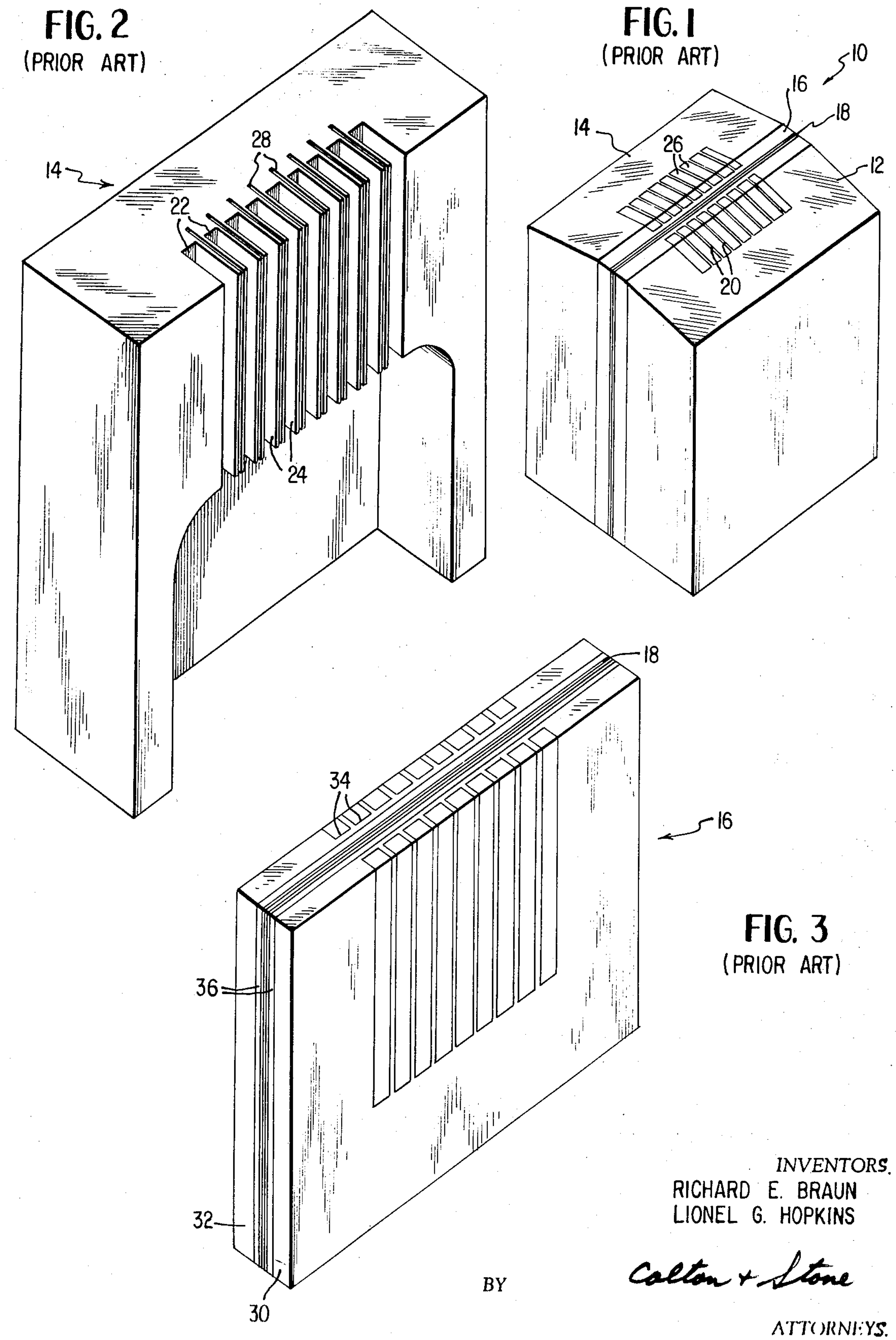
FIG. 2 (PRIOR ART) FIG. 1 (PRIOR ART) FIG. 3 (PRIOR ART)
FIG. 1 is a perspective view of a conventional magnetic head assembly.
FIG. 2 is an interior perspective view of the write housing section shown in FIG. 1.
FIG. 3 is a perspective view of the center section housing of FIG. 1.

A conventional, dual gap magnetic head assembly 10 including read and write housing sections 12, 14 separated by a center section housing 16 is depicted in FIG. 1 and includes the usual interhead and intertrack magnetic shielding 18, 20. The conventional write housing 14, shown in FIG. 2, is identical to the read housing 12 and includes a plurality of machined recesses 22, separated by housing extensions 24, for the receipt of the "C" cores or active transducer sections 26. Inasmuch as the read/write housing sections are fabricated from relatively poor electrically conductive, non-magnetic material such as brass or aluminum, it is necessary that the housing extensions 24 include machined slots 28 for the receipt of the usual intertrack shielding 20. The conventional center section housing, shown in FIG. 3, includes opposed sub-housings 30, 32 appropriately machined to provide "I" core receiving recesses 34 which sub-housings are separated by interhead shielding laminate 18. After the shielding laminate is built up, the same is integrated with sub-housings 30, 32 by a bonding material 36 to provide a unit-handled center section. The "C" cores 26 are then positioned in read/write housing section recesses 22 and the laminated intertrack shielding is inserted in recesses 28 after which time the various sections are assembled to produce the head assembly shown in FIG. 1.

As will be apparent from an inspection of FIGS. 2 and 3, the usual requirement for magnetic shielding not only involves the time consumption, expense and inherent error magnification necessarily associated with a large assemblage of parts but, also, requires the separate formation of center section sub-housings 30, 32, their assembly with shielding 18 and the additional machining operations required to produce the intertrack shield receiving recesses 28.

Figure 4:
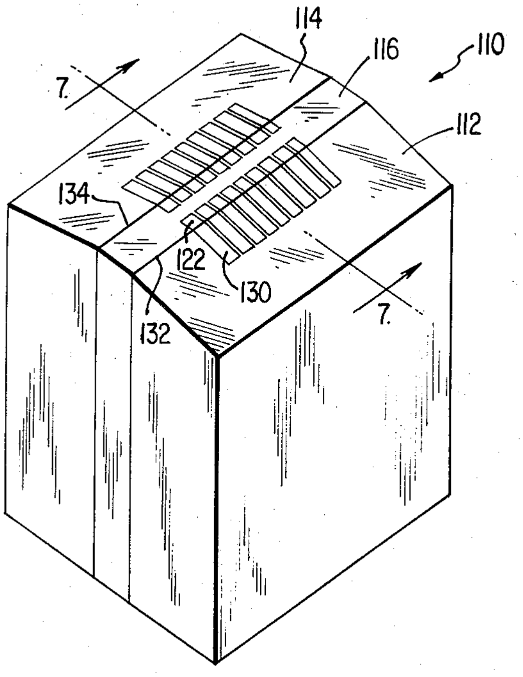
FIG. 4 is a perspective view of a magnetic head assembly constructed in accordance with the invention.
Figure 7:
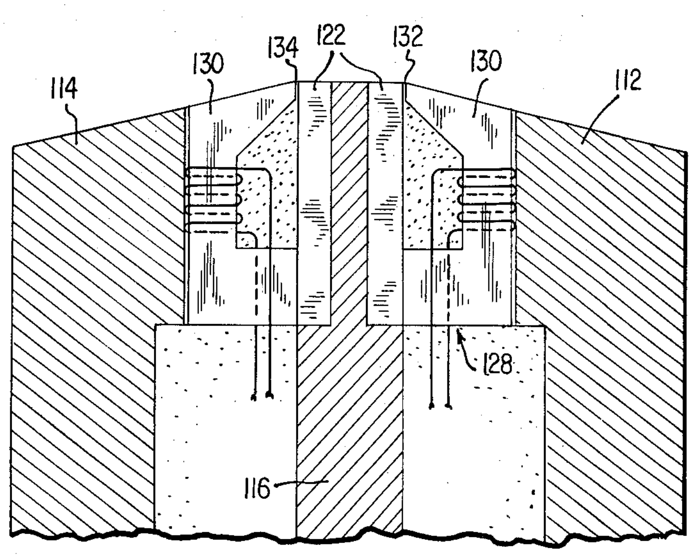
FIG. 7 is a cross-sectional view taken along the line 7—7 of FIG. 4.

Through the practice of the present invention, the total interhead and intertrack shielding is achieved as an incident of nothing more esoteric than the machining of the usual transducer section receiving recesses in three distinct housing elements fabricated from a highly conductive, non-magnetic material such as copper. Such an improved magnetic head assembly 110 is illustrated in FIG. 4 as comprising unipartite read and write housing sections 112, 114 separated by a unipartite center housing section 116.

Figures 5, 6:
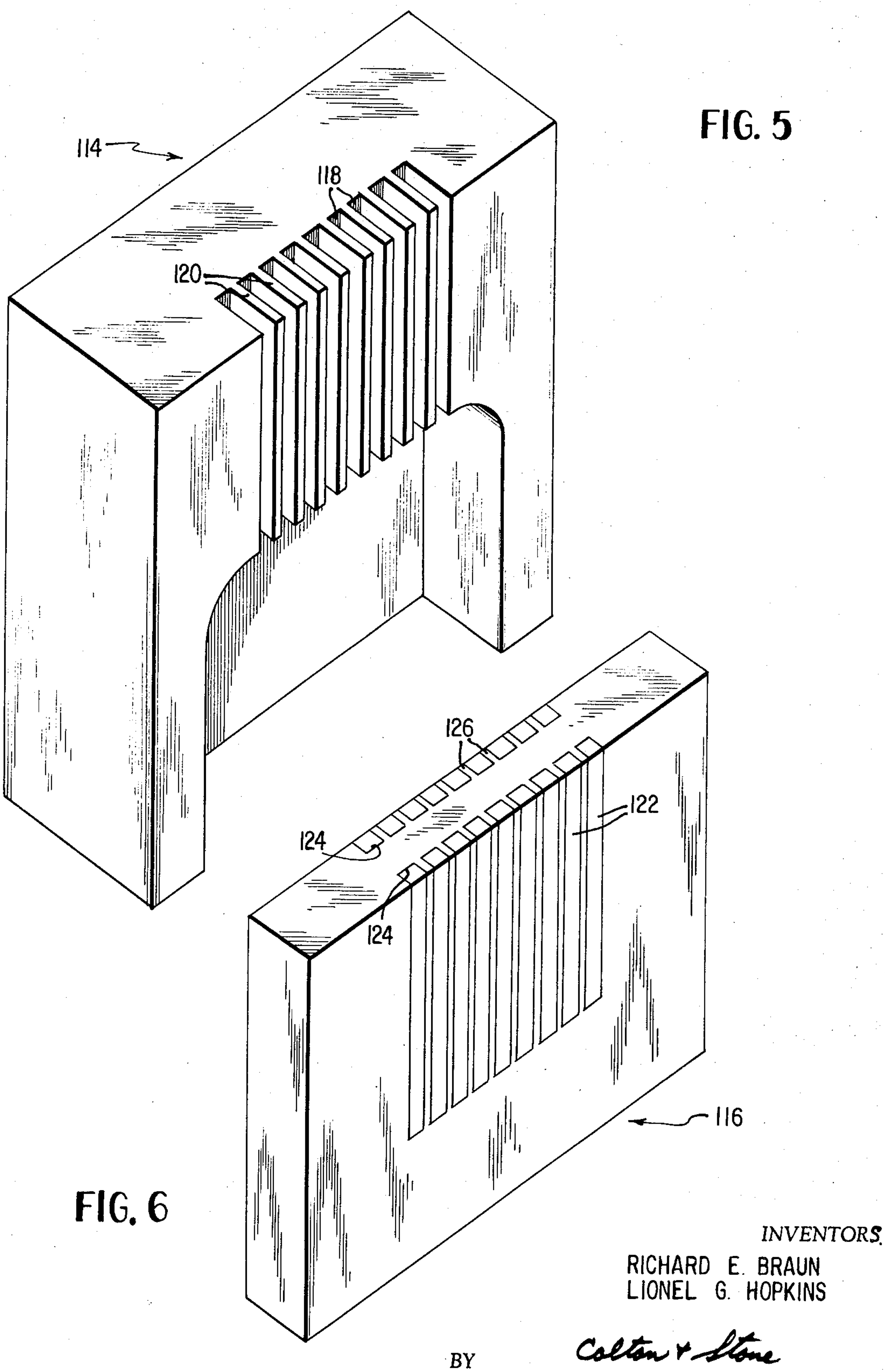
FIG. 5 is an interior perspective view of the write housing section shown in FIG. 4.
FIG. 6 is a perspective view of the center section housing of FIG. 4.

Each of the read and write housings 112, 114 include a plurality of core receiving recesses 118 separated by unitary housing or intertrack shielding extensions 120 as best shown in FIG. 5. Inasmuch as the housing extensions are non-magnetic and possess a high electrical conductivity; the eddy currents established in these extensions by virtue of the adjacently situated magnetic circuits effectively cancels lateral, or intertrack, cross-talk therebetween and magnetic shielding including magnetic lamina is not required.

Although lateral cross-talk is less of a problem between the inactive "I" cores 122 which are received in the center section housing recesses 124, the unitary center section housing or intertrack shielding extensions 126 separating the core sections 122 serve a similar function of eliminating intertrack cross-talk. A more important function served by the unitary highly conductive center section housing is that of preventing cross-talk between the read and write heads by virtue of the establishment of eddy currents in the center section housing intermediate each complete read and write transducer 128 each of which transducers includes the "C" or active core 130 and the "I" or inactive core 122 with the usual read and write gaps 132, 134.

It will thus be seen that both interhead and intertrack cross-talk is eliminated without the use of the conventional shielding laminations 18, 20 which, in turn, makes it possible to eliminate the requirement for a conventional multi-part center section housing 16 and the additional shield supporting recesses 28 in the conventional read/write housing 12, 14. Because of the fact that magnetic materials with their concomitant residual erase properties are not required to effect the necessary shielding, signal fidelity is substantially increased.

We claim:

1. In a dual gap, multiple track magnetic head assembly including opposed read/write housing sections separated by a center housing section, the improvement comprising; intertrack and interhead shielding means consisting of unitary portions of said housing sections; each of said housing sections consisting of non-magnetic material whose electrical conductivity is less than 2.824 micro-ohm centimeters at 20°C.

2. In a dual gap, multiple track magnetic head assembly including opposed read/write housing sections separated by a center housing section, the improvement comprising; intertrack and interhead shielding means unitary with said housing sections; said housing sections consisting of non-magnetic material having a high electrical conductivity; and said material having a resistivity of less than about 2 micro-ohm centimeters at 20°C.

3. The magnetic head assembly of claim 2 wherein said material is copper.

4. In a dual gap, multiple track magnetic head assembly including opposed read/write housing sections separated by a center housing section, the improvement comprising; intertrack shielding means consisting of unitary portions of at least one of said housing sections; and said one housing section consisting of non-magnetic material whose electrical conductivity is less than 2.824 micro-ohm centimeters at 20°C.

5. The magnetic head assembly of claim 4 including interhead shielding means unitary with said center housing section.

6. A unipartite center section adapted for assembly between opposed read/write housing sections in a magnetic head assembly, comprising; a plurality of core receiving recesses separated by unitary intertrack shielding extensions of said center section on opposite sides thereof; said unipartite center section comprising a highly electrically conductive, non-magnetic material; and said material being copper.

7. A unipartite read/write housing section adapted for assembly with a like read/write housing section and a separating center section housing in a magnetic head assembly, comprising; a plurality of core receiving recesses separated by unitary intertrack shielding extensions of said read/write housing section; said unipartite read/write housing section comprising a highly electrically conductive, non-magnetic material; and said material being copper.

8. A unipartite center section adapted for assembly between opposed read/write housing sections in a magnetic head assembly, comprising; a plurality of core receiving recesses separated by unitary intertrack shielding extensions of said center section on opposite sides thereof; said unipartite center section comprising a non-magnetic material whose electrical conductivity is less than 2.824 micro-ohm centimeters at 20°C.

9. A unipartite read/write housing section adapted for assembly with a like read/write housing section and a separating center section housing in a magnetic head assembly, comprising; a plurality of core receiving recesses separated by unitary intertrack shielding extensions of said read/write housing section; said unipartite read/write housing section comprising a non-magnetic material whose electrical conductivity is less than 2.824 micro-ohm centimeters at 20°C.

* * * * *